US005893947A

United States Patent [19]
Pease et al.

[11] Patent Number: 5,893,947
[45] Date of Patent: Apr. 13, 1999

[54] PROCESS FOR PURIFYING SUGAR SOLUTIONS

[75] Inventors: Stephen F. Pease, Brandon; Steven M. Weiss, Tampa, both of Fla.

[73] Assignee: Advanced Separation Technologies Incorporated, Lakeland, Fla.

[21] Appl. No.: 08/854,275

[22] Filed: May 9, 1997

[51] Int. Cl.$^6$ .............................. C13D 3/12; C13D 3/14
[52] U.S. Cl. .............................. 127/46.2; 127/55
[58] Field of Search ..................... 127/46.2, 55

[56] References Cited

U.S. PATENT DOCUMENTS

| | | | |
|---|---|---|---|
| 2,391,649 | 12/1945 | Shafor | 127/46 |
| 3,122,456 | 2/1964 | Meier et al. | 127/46 |
| 4,100,025 | 7/1978 | Enokizono et al. | 195/31 |
| 4,160,675 | 7/1979 | Pannekeet et al. | 127/46 |
| 4,247,340 | 1/1981 | Cartier | 127/48 |
| 4,325,742 | 4/1982 | Arena | 127/46.2 |
| 4,366,060 | 12/1982 | Leiser et al. | 210/635 |
| 4,519,845 | 5/1985 | Ou | 127/46.2 |
| 4,522,726 | 6/1985 | Barry et al. | 210/660 |
| 4,523,959 | 6/1985 | Exertier | 127/46.2 |
| 4,572,742 | 2/1986 | Kunin et al. | 127/46.2 |
| 4,587,953 | 5/1986 | Rosene | 127/46.2 |
| 4,764,276 | 8/1988 | Berry et al. | 210/264 |
| 4,808,317 | 2/1989 | Berry et al. | 210/660 |
| 4,871,397 | 10/1989 | Stevens | 127/55 |
| 4,950,332 | 8/1990 | Stringield et al. | 127/55 |
| 5,019,542 | 5/1991 | Bento | 502/25 |
| 5,096,500 | 3/1992 | San Miguel Bento | 127/46.2 |

OTHER PUBLICATIONS

"Corn Sweetener Refining with Ion Exchange Resins", Purolite (date unknown).
"Sweeteners From Starch", Separation Technologies, Rohm and Haas (date unknown).
Technical Data for "Macronet MN–150 Adsorbent Resin" (date unknown).
Macronet Literature (date unknown).
"Dowex Optipore Adsorbent", Dow (date unknown).
"Dowex Optipore Adsorbents: SelectFlo Capillary Microfiltration Elements", Dow (date unknown).
Advanced Separation Technologies Incorporated Sales Literature (date unknown).

*Primary Examiner*—David Brunsman
*Attorney, Agent, or Firm*—Burns, Doane, Swecker & Mathis, L.L.P.

[57] ABSTRACT

A process for decolorizing and demineralizing a sugar solution without the need for using cation exchange resins or activated carbon. The process includes the steps of contacting the sugar solution with a macroporous polymeric adsorbent having cationic functional sites to decolorize and demineralize the sugar solution, and contacting the sugar solution with an anion exchange resin to further demineralize the sugar solution.

14 Claims, No Drawings

5,893,947

1

PROCESS FOR PURIFYING SUGAR SOLUTIONS

FIELD OF THE INVENTION

The present invention generally relates to a process for purifying sugar solutions. The present invention is particularly directed to a process for decolorizing and demineralizing sugar solutions using adsorbents having cationic or anionic functional sites.

BACKGROUND OF THE INVENTION

Decolorization and demineralization are important steps in refining sugar solutions. Traditionally, sugar solutions have been decolorized and demineralized in a three-step process. The first step involves decolorizing the sugar solution with carbon adsorbents such as activated carbon. The sugar solution is then demineralized by removing cationic and anionic impurities in the second and third steps, respectively. The second step is carried out with a cation exchange resin, and the third step is carried out with an anion exchange resin.

Unfortunately, using activated carbon to decolorize sugar solutions has some drawbacks. One drawback is that activated carbon presents serious handling problems. Since activated carbon particles are very fine, they create clouds of dust when being transferred. This poses a health concern for workers who come into contact with the clouds. Moreover, the particles are very abrasive. Consequently, they have a tendency to wear down equipment relatively quickly.

As a result of the problems associated with using activated carbon, efforts have been made to find an adsorbent having an adsorptive capacity similar to that of activated carbon, but without its drawbacks. One such effort is described in U.S. Pat. No. 4,950,332 wherein it is proposed to substitute activated carbon with a certain macroporous copolymer adsorbent for decolorizing sugar solutions. It is said that the adsorbent employed therein can be as effective as carbon in adsorbing or removing color bodies from sugar solutions.

While the process described in U.S. Pat. No. 4,950,332 has advantages, namely the elimination of the need for activated carbon, the process also has drawbacks. For example, like processes which use activated carbon, the process requires three steps to purify a sugar solution. There is no mention in the patent of a desire to obtain a more cost-effective or efficient process for purifying sugar solutions, particularly, one that performs both decolorization and demineralization in a fewer number of steps. Thus, there is an ongoing need in the art for a more efficient, cheaper, and simpler process for purifying sugar solutions.

SUMMARY OF THE INVENTION

Accordingly, it is an object of the present invention to provide a more efficient, cheaper, and simpler process for purifying sugar solutions. The present invention achieves this and other objects by providing a two-step process for purifying sugar solutions.

In particular, the present invention relates to a process for decolorizing and demineralizing a sugar solution with a macroporous polymeric adsorbent having cationic functional sites to decolorize and demineralize the sugar solution, without having to use an additional step involving a cation exchange resin or activated carbon, and then contacting the sugar solution with an anion exchange resin to further demineralize the sugar solution.

2

The present invention is directed to the unexpected and surprising discovery that when sugar solutions are contacted with a macroporous polymeric adsorbent having cationic functional sites the adsorbent not only decolorizes, but also demineralizes the sugar solution. That is, the adsorbent removes cationic impurities as well as color bodies from the sugar solution. As a result, the demineralization step which is usually carried out with a cation exchange resin in a typical sugar purification process can be eliminated, thereby reducing the number of purification steps needed to remove the undesired impurities.

Overall, the two-step process according to the present invention can be as effective as the conventional adsorbent/cation exchange resin/anion exchange resin process for decolorizing and demineralizing sugar solutions. By eliminating the cation exchange resin demineralization step without removing its function, the present invention achieves a process that is more efficient, cheaper, and more simple to operate than conventional sugar solution purification processes.

In a second embodiment of the present invention, the anion exchange resin in the second step can be replaced with a macroporous polymeric adsorbent having anionic functional sites.

DETAILED DESCRIPTION OF THE INVENTION

This invention is generally directed to a process for decolorizing and demineralizing sugar solutions using a macroporous polymeric adsorbent having cationic or anionic functional sites. However, prior to discussing the invention in further detail, the following terms will first be defined.

The term "decolorization" refers to the removal of color, flavor, odor, or UV compounds or combinations thereof from a sugar solution. Color compounds include (1) caramels, (2) melanoidins, and (3) polyphenolics and flavanoids. The caramels are thermal degradation products of sugars. Melanoidins are, in general, Maillard reaction products of amine compounds and sugar groups. Polyphenolics and flavanoids are oxidation products of phenolic compounds derived from a raw sugar solution.

In addition to the three classes of color bodies, there are several noncolored compounds that can develop color or can react to form color bodies during processing or storage of sugar solutions. Such materials are known as color precursors, and for the purpose of describing this invention, the term "color bodies" is intended to include such color precursors. These precursors include amino acids, hydroxy acids, aldehydes, iron compounds which complex with phenolics, 5-hydroxymethyl-2-furfural, 3-deoxy-d-glucose, and reducing sugars.

As used herein, the term "UV compounds" refers to a class of compounds that absorb ultra violet light in a spectrophotometer. In certain applications, the presence of these compounds is undesired. Therefore, the UV compounds are desirably removed from the sugar solution at least in the decolorization step.

The term "demineralization" refers to the removal of ash, protein, or organic acids or combinations thereof from a sugar solution. Ash includes potassium, ammonium, sodium, calcium, and magnesium cations as well as chloride, sulfate, and phosphate anions. Organic acids include lactic acid, succinic acid, and the like.

The term "sugar solution" refers to sweetener syrups commonly known in the art. Sweetener syrups include sucrose, glucose, dextrose, fructose, and corn syrups. Sugar solution as used in the present invention also includes fruit juices and aqueous solutions of sorbitol. Preferably, the sugar solution is dextrose, fructose, or corn syrup.

The term "macroporous polymeric adsorbent" refers to a special class of adsorbents made of a macroporous copolymer. Such macroporous copolymers are described in, e.g., U.S. Pat. No. 4,382,124; the content of which is hereby incorporated by reference. Typically, these adsorbents are made by copolymerizing styrene with high amounts of divinylbenzene and high amounts of a swelling solvent such as toluene. The copolymers are then crosslinked in the swollen state during a postpolymerization process. Processes for preparing these adsorbents are disclosed in, e.g., U.S. Pat. Nos. 4,191,813 and 4,263,407, and in East German Patent No. 249,274; the contents of which are hereby incorporated by reference.

Macroporous polymeric adsorbents are also commercially available from Purolite Company (U.S.A.) and Dow Chemical Company under the brandnames of MACRONET™ and DOWEX OPTIPORE®, respectively. Preferably, the macroporous polymeric adsorbent for use in the present invention swells less than 10% of its dry volume upon contact with the sugar solution. More preferably, the macroporous polymeric adsorbent swells less than 5% of its dry volume upon contact with the sugar solution.

Prior to use, the polymeric adsorbents are functionalized to have either cationic or anionic functional sites by conventional methods. Suitable methods for functionalizing the adsorbents include those described in U.S. Pat. No. 4,950, 332; the content of which is hereby incorporated by reference.

The preferred macroporous polymeric adsorbents having cationic functional sites of the present invention are those which have a surface area of about 750 to about 1500 $m^2/g$, a pore volume of about 0.1 to about 1.5 ml/g, and an average pore diameter of about 25 to about 1000 Å. More preferably, the macroporous polymeric adsorbents having cationic functional sites have a surface area of about 900 to about 1100 $m^2/g$, a pore volume of about 1 to about 1.1 ml/g, and an average pore diameter of about 850 to about 950 Å. Such adsorbents can be obtained from Purolite Co. (U.S.A.). Even more preferably, the macroporous polymeric adsorbent having cationic functional sites is Purolite Macronet 500.

The preferred macroporous polymeric adsorbents having anionic functional sites of the present invention are those which have a surface area of about 750 to about 1500 $m^2/g$, a pore volume of about 0.1 to about 1.5 ml/g, and an average pore diameter of about 25 to about 1000 Å. More preferably, the macroporous polymeric adsorbents having anionic functional sites have a surface area of about 1000 to about 1500 $m^2/g$, a pore volume of about 0.2 to about 0.4 ml/g, and an average pore diameter of about 25 to about 100 Å. Such adsorbents can also be obtained from Purolite Co. (U.S.A.). Even more preferably, the macroporous polymeric adsorbent having anionic functional sites is Purolite Macronet 170.

As mentioned above, the present invention relates to a process for decolorizing and demineralizing a sugar solution without the need for using a cation exchange resin or activated carbon. The process includes contacting the sugar solution with a macroporous polymeric adsorbent having cationic functional sites to decolorize and demineralize the sugar solution. The sugar solution is then contacted with an anion exchange resin to further demineralize the sugar solution.

The sugar solution may be contacted with the macroporous polymeric adsorbent having cationic functional sites and the anion exchange resin using conventional methods which result in intimate contact between the sugar solution and the adsorbent and the resin. Suitable methods include mixed beds, packed beds, fluidized beds, moving beds, stirred tanks, and batch tanks. The contacting may be carried out batchwise, semi-continuously, or continuously. Additionally, the sugar solution may be contacted in multiple units containing the macroporous polymeric adsorbent and/or the anion exchange resin. The multiple units may be arranged in series or in parallel.

Preferably, the sugar solution is contacted with the adsorbent and the resin using Advanced Separation Technologies, Inc.'s continuous ISEP® system. This system is described in various U.S. patents including U.S. Pat. Nos. 4,522,726, 4,764,276, and 4,808,317; the contents of which are hereby incorporated by reference. In essence, the continuous method employs a plurality of rotating chambers (e.g., 12, 20 or 30) filled with the adsorbent or the resin. The sugar solution is supplied individually to these chambers through a plurality of feed ports which are in periodic fluid communication with each of the chambers. The chambers are mounted on a turntable which rotates the chambers at a constant speed as the chambers cycle continuously through various separation phases. The ISEP® system directs the sugar solution through the chambers and delivers a purified sugar solution continuously.

The residence time required for contacting between the sugar solution and the adsorbent or the resin depends on several factors. These factors include (1) the physical properties of the adsorbent and the resin, (2) the amount of color bodies and minerals initially present, (3) the level of decolorization and demineralization desired, (4) the volume of the adsorbent or the resin, (5) the viscosity of the sugar solution, (6) the concentration of dissolved sugar (often referred to as dissolved solids), (7) the processing temperature, and (8) the pH of the sugar solution. Therefore, the residence time for each process should be optimized based on these factors. Preferably, the residence time ranges from about 1 minute to about 120 minutes. More preferably, the residence time ranges from about 6 minutes to about 60 minutes.

The temperature at which the sugar solution is contacted with the adsorbent or the resin should remain below the temperature at which the sugar solution will be adversely affected. Generally, temperatures ranging from about 20° C. to about 80° C. are operable. Preferably, the temperature ranges between about 35° C. and about 55° C.

The amount of adsorbent or resin required, largely depends on equipment configuration, concentration of dissolved solids, the level and type of color bodies and minerals present, and the level of decolorization and demineralization desired. Generally, the amount of adsorbent or resin used ranges from 0.1 to 11 cubic feet of adsorbent or resin per gallon of sugar solution per minute of flow. Preferably, the amount of adsorbent or resin used ranges from 2 to 4 cubic feet of adsorbent or resin per gallon of sugar solution per minute of flow.

The pH of the sugar solution is preferably maintained at a level which allows for the optimum adsorption of color bodies and minerals by the adsorbent and the resin. The pH of the sugar solution prior to decolorization and demineralization depends on previous processing steps. It is desirable, however, to contact the absorbent or the resin with the sugar solution at a pH ranging from about 1 to about 10, preferably from about 3 to about 6, and more preferably from about 4 to about 5.

The amount of dissolved sugar present in the sugar solution will vary depending on the source of the sugar solution. The amount of dissolved sugar ranges up to about 70 weight percent with about 20 to about 50 weight percent being more preferred.

Any anion exchange resin which is effective to demineralize sugar solutions can be used in the process of the present invention. Various suitable anion exchange resins are known in the art. Exemplary anion exchange resins suitable for use in the present invention include those obtained from Dow, Purolite, Sybon, Bayer, and Mitsubishi such as Dow 66 (monosphere version) and Purolite A-103S.

In a second embodiment of the present invention, the anion exchange resin is replaced with a macroporous polymeric adsorbent having anionic functional sites. The macroporous polymeric adsorbent having anionic functional sites can demineralize the sugar solution as effectively as the anion exchange resin.

The process conditions as well as the equipment required for contacting the macroporous polymeric adsorbent having anionic functional sites with the sugar solution are substantially the same as those employed with an anion exchange resin. However, various process parameters such as flowrate may have to be adjusted or optimized to obtain the desired decolorization and demineralization.

Preferably, in addition to demineralizing, the macroporous polymeric adsorbent having anionic functional sites or the anion exchange resin in the second step also decolorizes the sugar solution by removing most of the residual color bodies not removed in the first step.

Once color bodies and minerals are loaded onto the adsorbent or the resin, it is desirable and preferable to desorb those components from the adsorbent and the resin aim using a regeneration process that takes advantage of existing equipment and process streams available at the plant. Additionally, it would be advantageous to avoid the requirement of transferring the adsorbent or the resin from a decolorization and demineralization facility to a regeneration facility. Therefore, in the preferred process of the present invention, the adsorbent and the resin are contacted with the sugar solution and are regenerated in the same equipment, e.g., packed columns.

The cationic polymeric adsorbent is preferably regenerated in two steps. The cationic polymeric adsorbent is first contacted with a basic solution and then an acidic solution. Suitable basic solutions include sodium hydroxide, ammonia, sodium carbonate solution, and other commonly known bases. Suitable acidic solutions include hydrochloride acid, sulfuric acid, and other commonly known acids. More preferably, the cationic polymeric adsorbent is regenerated by contact with a 4% sodium hydroxide solution and then with a 7% hydrogen chloride solution.

The regeneration of the cationic polymeric adsorbent can be carried out at a temperature ranging from about 170° F. to about 240° F., and at the same general pressures as the decolorization and demineralization steps.

The anion exchange resin can be regenerated with a basic solution. Suitable basic solutions include sodium hydroxide, ammonia, sodium carbonate solution, and other commonly known bases. Preferably, the basic regenerating solution is 4% sodium hydroxide.

The regeneration of the anion exchange resin can be carried out at the same general temperatures and pressures as the decolorization and demineralization steps.

In the case of an anionic polymeric adsorbent, it is preferably regenerated with the same solutions as the cationic polymeric adsorbent and at the same general conditions. However, the order of the steps should be reversed.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for decolorizing and demineralizing a sugar solution, said process comprising the steps of:
    (a) contacting said sugar solution with a macroporous polymeric adsorbent having cationic functional sites to decolorize and demineralize said sugar solution; and
    (b) contacting said sugar solution with an anion exchange resin to further demineralize said sugar solution,
    wherein said process is carried out without an additional step of contacting said sugar solution with a cation exchange resin.

2. The process according to claim 1, wherein said sugar solution is a solution of fruit juice, fructose, sucrose, dextrose, sorbitol, or corn syrup.

3. The process according to claim 1, wherein said macroporous polymeric adsorbent having cationic functional sites swells less than 5% of its dry volume upon contact with said sugar solution.

4. The process according to claim 1, wherein said macroporous polymeric adsorbent having cationic functional sites is a copolymer of styrene and divinylbenzene.

5. The process according to claim 1, wherein said macroporous polymeric adsorbent having cationic functional sites has a surface area of about 900 to about 1100 $m^2/g$, a pore volume of about 1 to about 1.1 ml/g, and an average pore diameter of about 850 to about 950 Å.

6. The process according to claim 1, wherein said anion exchange resin additionally removes color bodies from said sugar solution.

7. A process for decolorizing and demineralizing a sugar solution, said process comprising the steps of:
    (a) contacting said sugar solution with a macroporous polymeric adsorbent having cationic functional sites to decolorize and demineralize said sugar solution; and
    (b) contacting said sugar solution with a macroporous polymeric adsorbent having anionic functional sites to further demineralize said sugar solution.

8. The process according to claim 7, wherein said sugar solution is a solution of fruit juice, fructose, sucrose, dextrose, sorbitol, or corn syrup.

9. The process according to claim 7, wherein said macroporous polymeric adsorbent having cationic functional sites has a surface area of about 900 to about 1100 $m^2/g$, a pore volume of about 1 to about 1.1 ml/g, and an average pore diameter of about 850 to about 950 Å.

10. The process according to claim 7, wherein said macroporous polymeric adsorbent having anionic functional sites has a surface area of about 1000 to about 1500 $m^2/g$, a pore volume of about 0.2 to about 0.4 ml/g, and an average pore volume of about 25 to about 100 Å.

11. The process according to claim 7, wherein said process is carried out without an additional step of contacting said sugar solution with a cation exchange resin.

12. The process according to claim 7, wherein said macroporous polymeric adsorbent having anionic functional sites additionally removes color bodies from said sugar solution.

13. The process according to claim 7, wherein said macroporous polymeric adsorbent having cationic functional sites and said macroporous polymeric adsorbent having anionic functional sites swell less than 5% of their dry volume upon contact with said sugar solution.

14. The process according to claim 7, wherein said macroporous polymeric adsorbent having cationic functional sites and said macroporous polymeric adsorbent having anionic functional sites are made of a copolymer of styrene and divinylbenzene.

* * * * *